May 22, 1945.   J. P. BELL   2,376,750
DENTAL FLOSS HOLDER
Filed Sept. 13, 1944
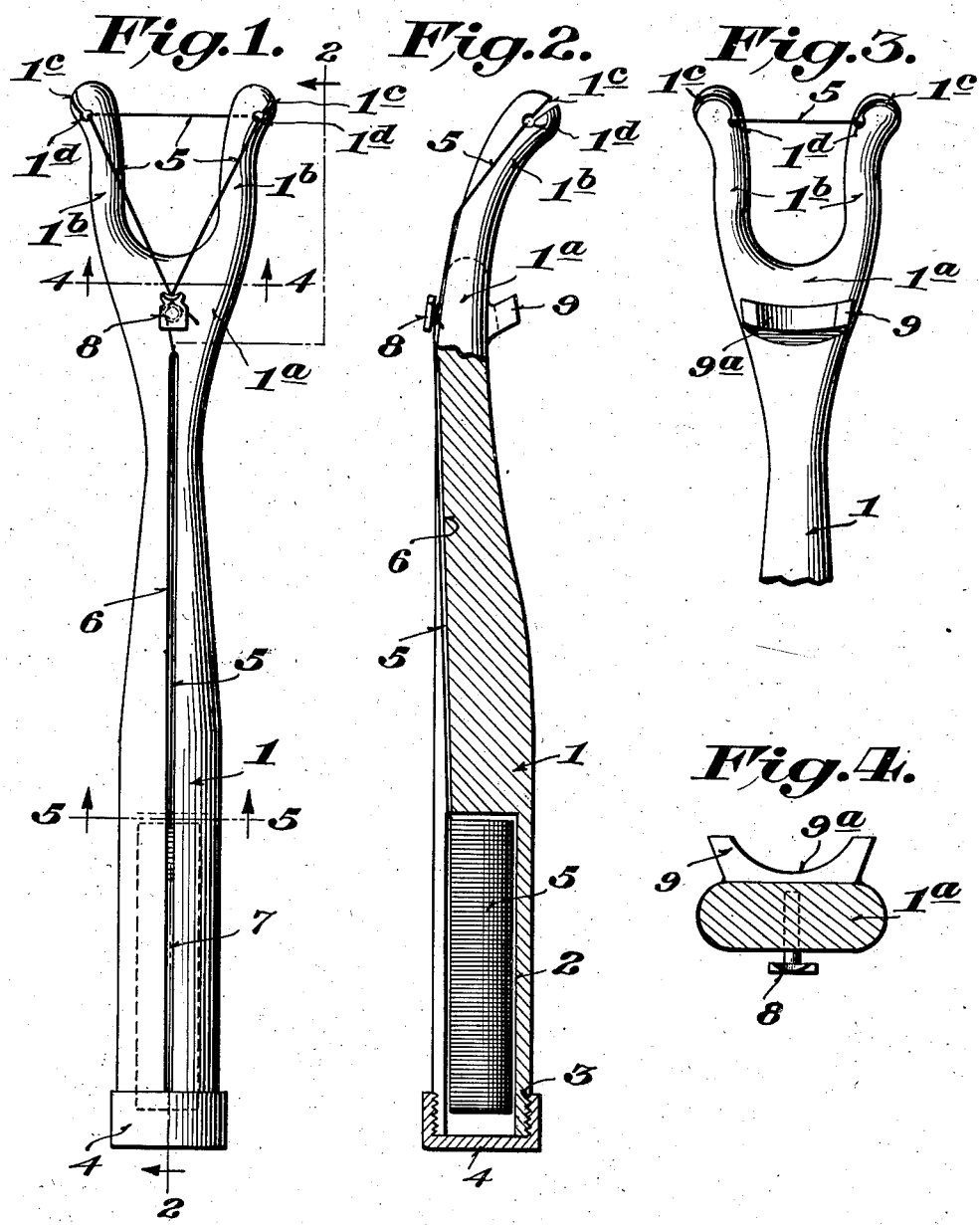

Patented May 22, 1945

2,376,750

UNITED STATES PATENT OFFICE 2,376,750

DENTAL FLOSS HOLDER

John P. Bell, Baltimore, Md.

Application September 13, 1944, Serial No. 553,894

11 Claims. (Cl. 132—92)

This invention is a novel dental floss holder adapted for manual use in cleaning the opposed faces of adjacent teeth, the same consisting of a handle having a magazine therein for a spool of dental floss which may be guided to the bifurcated inner end of the handle provided with slits in the bifurcations through which the dental floss from the spool is passed in order to bridge the bifurcations, the end of the floss being secured to a suitable clip or clasp disposed at the base of the bifurcations, and the base of the bifurcations at the side opposite from the clip or clasp being provided with a fulcrum saddle whereby the bifurcated end may be fulcrumed or steadied on the face of an adjacent tooth to thereby permit the holder to be used by an inexperienced person without danger of injuring or cutting the gums.

Heretofore dental floss holders of substantially the same type have been provided without my fulcrum saddle, and it is found in practice that users often cannot hold the bifurcated end steady enough to successfully actuate the holder without injuring or cutting the gums while the strip of floss bridging the bifurcations is engaged between adjacent teeth.

My holder, provided with such fulcrum saddle, greatly facilitates the use thereof in that it maintains the bifurcated end fulcrumed and steadied upon the face of an adjacent tooth, whereby the user can more readily manipulate the floss without injury to the gums.

Other minor objects of the invention will be hereinafter set forth.

I will explain the invention with reference to the accompanying drawing, which illustrates one practical embodiment thereof to enable others to adopt and use the same; and will summarize in the claims, the novel features of construction, and novel combinations of parts, for which protection is desired.

In said drawing:

Fig. 1 is a top plan view of the holder showing the dental floss threaded therein for use.

Fig. 2 is a longitudinal section on the line 2—2, Fig. 1.

Fig. 3 is a bottom plan view of the underside of the bifurcated end of the holder, showing the location of the fulcrum saddle.

Fig. 4 is an enlarged transverse section on the line 4—4, Fig. 1.

Fig. 5 is an enlarged section on the line 5—5, Fig. 1.

As shown, the holder preferably comprises a handle portion 1, preferably formed of plastic, metal, or other smooth non-corrosive material, having at one end a circular bore 2 extending to the outer end of the handle and forming a reservoir for a spool of dental floss 5 disposed therein, the outer end of the handle 1 being externally threaded as at 3 to receive a correspondingly internally threaded cap 4 whereby the end of the bore may be closed to maintain therein the spool of dental floss 5, as shown in Fig. 2.

Preferably a groove 6 is formed in the upper side of the handle 1, the outer end of said groove extending into a slot 7 in alignment therewith opposite the bore 2, the inner end of the groove 6 terminating adjacent the base 1a of the integral bifurcations 1b formed at the inner end of holder 1, said bifurcations being preferably slightly curved towards the lower side of the holder, as shown more particularly in Fig. 2.

In the outer end of each bifurcation 1b is a slit 1c terminating at its inner end in an enlargement 1d; and on the upper face of the base portion 1a, in alignment and spaced from the inner end of groove 6 is a clip or clasp 8 of any desired construction but preferably comprising a headed lug formed integrally with the handle 1.

The free end of the spool of dental floss 5 contained in the reservoir 2 is passed through the slot 7 and along the groove 6 and is wrapped with several turns around the clip or clasp 8, leaving a length beyond the wrappings of sufficient length that the floss 5 may be slipped through the slit 1c of one bifurcation 1b so as to seat in the enlargement 1d, then bridging the bifurcations and passing through the slit 1c of the other bifurcation and seating in its enlargement 1d, as clearly shown, the outer end of the floss 5 being redirected to the clip or clasp 8 and engaged therewith by wrapping same around the clip or clasp, said clip or clasp 8 thus serving to hold both ends of the bridging portion of the floss 5 taut for use.

On the bottom side of the base portion 1a is a fulcrum saddle 9 shown more particularly in Figs. 2, 3 and 4, the same preferably comprising an integral lug projecting laterally from the portion 1a on its underside and having a concavely arcuate outer face 9a, said saddle 9 being disposed on the opposite face of the base portion 1a from the clip or clasp 8.

In operation, by the above construction, when it is desired to use the holder with the floss 5 positioned and tensioned as in Fig. 1, the holder is manually inserted into the mouth of the user and the concave face 9a of saddle 9 seated upon a tooth adjacent the tooth to be cleaned for the purpose of steadying the inner end of the holder in the mouth. The outer end of the holder, being then gripped by the hand of the user, may be nicely adjusted to cause the bridging portion of the floss 5 to enter the spaces between adjacent teeth so that the floss may be worked up and down or across the teeth as desired. The use of the saddle 9 makes it possible to operate the holder with a degree of care which will prevent injury or cutting of the gums adjacent the teeth being cleaned; and thus may be used by persons more or less inexperienced in the use of such holders, and by persons with unsteady hands, without danger of injury to the gums.

At any time a used portion of the floss 5 may be detached from the clip or clasp 8, and a new length drawn from the reservoir 2 and similarly attached in position for use. The bifurcated end of the holder, being smooth and containing no sharp angles, may be readily kept clean of dirt or other matter to maintain the holder sterilized.

I do not limit my invention to the exact form shown in the drawing, for obviously changes may be made therein within the scope of the claims.

I claim:

1. A dental floss holder, comprising a handle having one end bifurcated adapted to hold a length of dental floss bridging the bifurcations; means for clamping the floss in said bridging position; and a concave fulcrum saddle on the handle at the base of the bifurcations adapted to seat upon the face of a tooth during operation of the holder on an adjacent tooth.

2. In a holder as set forth in claim 1, said fulcrum saddle being formed integrally with the holder, and comprising a laterally extending lug having a concavely recessed outer face.

3. A dental floss holder, comprising a handle having a bore in one end adapted to receive a spool of dental floss; a closure for said bore; the other end of the holder being bifurcated and adapted to hold a length of dental floss extending from the spool and bridging the bifurcations; means for clamping the floss in said bridging position; and a concave fulcrum saddle on the handle at the base of the bifurcations adapted to seat upon the face of a tooth during operation of the holder on an adjacent tooth.

4. In a holder as set forth in claim 3, said fulcrum saddle being formed integrally with the holder, and comprising a laterally extending lug having a concavely recessed outer face.

5. In a holder as set forth in claim 3, said holder having a guide groove communicating with the bore and extending towards the said clamping means.

6. A dental floss holder, comprising a handle having a bore in one end adapted to receive a spool of dental floss; a removable closure for said bore; the other end of the holder being bifurcated; the outer ends of the bifurcations having floss receiving slits through which a length of floss from the spool may be passed to bridge the bifurcations; means for clamping the floss in said bridging position; and a concave fulcrum saddle on the handle at the base of the bifurcations adapted to seat upon the face of a tooth during operation of the holder on an adjacent tooth.

7. In a holder as set forth in claim 6, said fulcrum saddle being formed integrally with the holder, and comprising a laterally extending lug having a concavely recessed outer face.

8. In a holder as set forth in claim 6, said holder having a guide groove communicating with the bore and extending towards the said clamping means.

9. A dental floss holder, comprising a handle having a bore in one end adapted to receive a spool of dental floss; a removable closure for said bore; the other end of the holder being bifurcated; the outer ends of the bifurcations having floss slits provided with enlarged inner ends through which a length of floss from the spool may be passed to bridge the bifurcations; means for clamping the floss in said bridging position; and a concave fulcrum saddle on the handle at the base of the bifurcations adapted to seat upon the face of a tooth during operation of the holder on an adjacent tooth.

10. In a holder as set forth in claim 9, said fulcrum saddle being formed integrally with the holder, and comprising a laterally extending lug having a concavely recessed outer face.

11. In a holder as set forth in claim 9, said holder having a guide groove communicating with the bore and extending towards the said clamping means.

JOHN P. BELL.